United States Patent [19]

Schmode et al.

[11] Patent Number: 5,500,998

[45] Date of Patent: Mar. 26, 1996

[54] TONGS FOR DRESSING CONDUCTOR ENDS

[75] Inventors: Hartmut Schmode, Blomberg; Siegfried Storm, Schlangen; Helmut Thiele, Kamen; Ulrich Wiebe, Dörentrup; Bernd David; Detley Hetland, both of Detmold; Hans-Joachim Kornfeld, Vlotho; Johann-Georg Salten, Lage/Hagen, all of Germany

[73] Assignee: Weidmüller Interface GmbH & Co., Detmold, Germany

[21] Appl. No.: 290,295

[22] Filed: Aug. 15, 1994

Related U.S. Application Data

[63] Continuation of Ser. No. 971,081, Nov. 4, 1992, abandoned.

[30] Foreign Application Priority Data

Nov. 4, 1991 [DE] Germany ............................ 41 36 302.7

[51] Int. Cl.[6] .......................... H01R 43/045; B21D 7/06; B21D 43/28
[52] U.S. Cl. ............................ 29/751; 29/566.4; 29/863; 72/409.12
[58] Field of Search .................................... 29/566.4, 750, 29/751, 758, 268, 861, 863; 7/107; 72/410; 81/341, 389, 421, 424

[56] References Cited

U.S. PATENT DOCUMENTS

| 3,075,198 | 1/1963 | Over ....................................... 29/751 X |
| 3,710,610 | 1/1973 | McCaughey .............................. 29/751 |
| 3,903,725 | 9/1975 | Rommel ...................................... 72/410 |
| 3,911,712 | 10/1975 | Wustinger et al. .................... 29/751 X |
| 4,022,051 | 5/1977 | Ichikawa ................................... 72/410 |
| 4,126,936 | 11/1978 | Koller ....................................... 29/628 |
| 4,774,762 | 10/1988 | Gobeil ....................................... 29/861 |
| 5,347,705 | 9/1994 | Schmode et al. ...................... 29/566.4 |

FOREIGN PATENT DOCUMENTS

| 380388 | 8/1990 | European Pat. Off. ................. 29/751 |
| 2149167 | 4/1973 | Germany ................................. 29/751 |
| 2402187 | 5/1979 | Germany . |
| 4008515 | 1/1992 | Germany ................................. 29/751 |

Primary Examiner—Peter Vo
Attorney, Agent, or Firm—Birch, Stewart, Kolasch & Birch

[57] ABSTRACT

Tongs for dressing conductor ends have two handles (3, 11) which can move relative to one another, at least two dressing stations (4, 8), and a drive device (10, 12, 20), via which the dressing stations can be driven during operation of the handles. At least one (18, 19) of the dressing stations (4, 8; 18, 19) can be coupled to the drive device (10, 12, 20) with the aid of the conductor end (28) which is to be dressed. The dressing station which can be coupled to the drive device is thus driven only when this is also actually required.

26 Claims, 6 Drawing Sheets

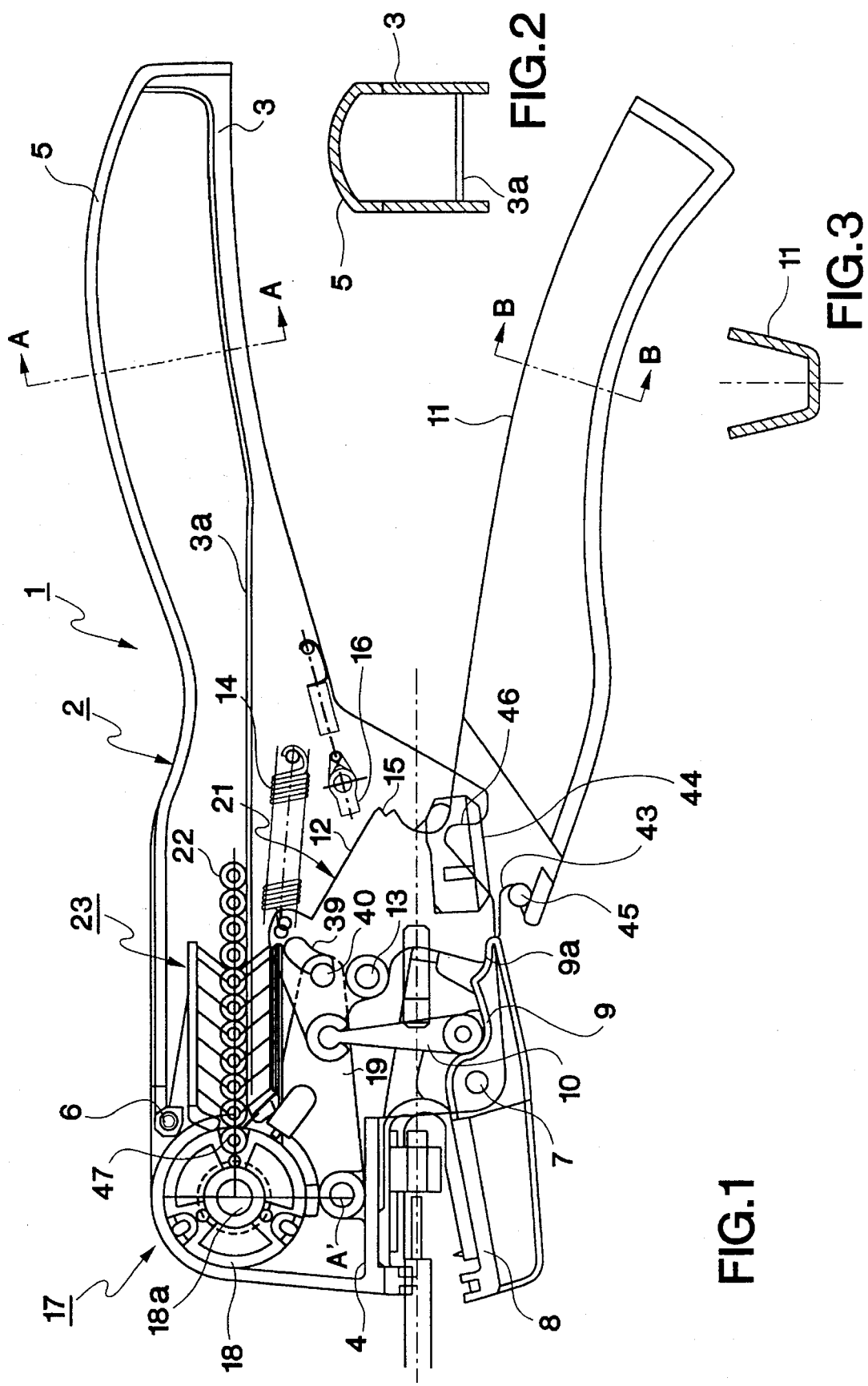

5,500,998

TONGS FOR DRESSING CONDUCTOR ENDS

This application is a continuation of application Ser. No. 07/971,081 filed on Nov. 4, 1992, now abandoned.

FIELD OF THE INVENTION

The invention relates to tongs for dressing conductor ends.

DESCRIPTION OF THE BACKGROUND ART

Types of tongs have already been disclosed in DE-C-2, 402,187. The known tongs relate to stripping tongs which have two handles which can move relative to one another, at least one dressing station for stripping conductor ends and one drive device, via which the dressing station can be driven during operation of the handles.

SUMMARY OF THE INVENTION

The invention is based on the object of creating tongs which can dress conductor ends in a different manner, the intention being to be able to connect individual dressing functions of the tongs as required, to be precise directly by the movement sequence during the dressing process.

Tongs according to the invention are distinguished in that there is at least one further dressing station which can be driven via the drive device and in that, furthermore, at least one of the dressing stations can be coupled to the drive device with the aid of the conductor end to be dressed.

According to the invention, combination tongs are thus obtained which, although they have a plurality of dressing stations which can be driven by the drive device not all of them are, however, permanently driven via the drive device with the movement of the handles. At least one of the dressing stations remains decoupled from the drive device until it is actually required. In consequence, the wear on this dressing device can be reduced while, on the other hand, the tongs can be operated with less force applied when the dressing station is decoupled.

The dressing station is coupled to the drive device immediately in the course of the movement of the conductor end, or by using the conductor end itself, so that no further adjustment processes need to be carried out by the user. This simplifies the handling of the tongs quite considerably.

A dressing station of the tongs, which is permanently driven via the drive device during movement of the handles, may, for example, be a stripping station, while the dressing station which can be coupled to the drive device may be a crimping station. The stripping of the conductor ends and the crimping of, for example, core end sleeves onto conductor ends are processes which generally follow one another directly. Both functions can be carried out using the tongs according to the invention so that it is no longer necessary to use separate tongs for these dressing processes. If only stripping is intended, then in practice the crimping function remains disconnected so that the tongs can be operated with less force applied.

The tongs can, of course, have further additional dressing stations, for example a cutting station for cutting through conductors. However, this cutting station need not necessarily be driven via the drive device. The cutting devices of the cutting station may also be attached directly to the handles. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An exemplary embodiment of the invention is described in more detail in the following text, making reference to the drawings which are given by way of illustration only, and thus are not limitative of the present invention, and in which:

FIG. 1 shows a longitudinal section through the tongs with the handles not pressed together, FIG. 2 shows a cross-section through an upper handle of the tongs along the line A—A in FIG. 1, FIG. 3 shows a cross-section through a lower handle of the tongs, along the line B—B in FIG. 1.

DETAILED DESCRIPTION OF THE PREFERRED EMBODIMENTS

Figure 4:
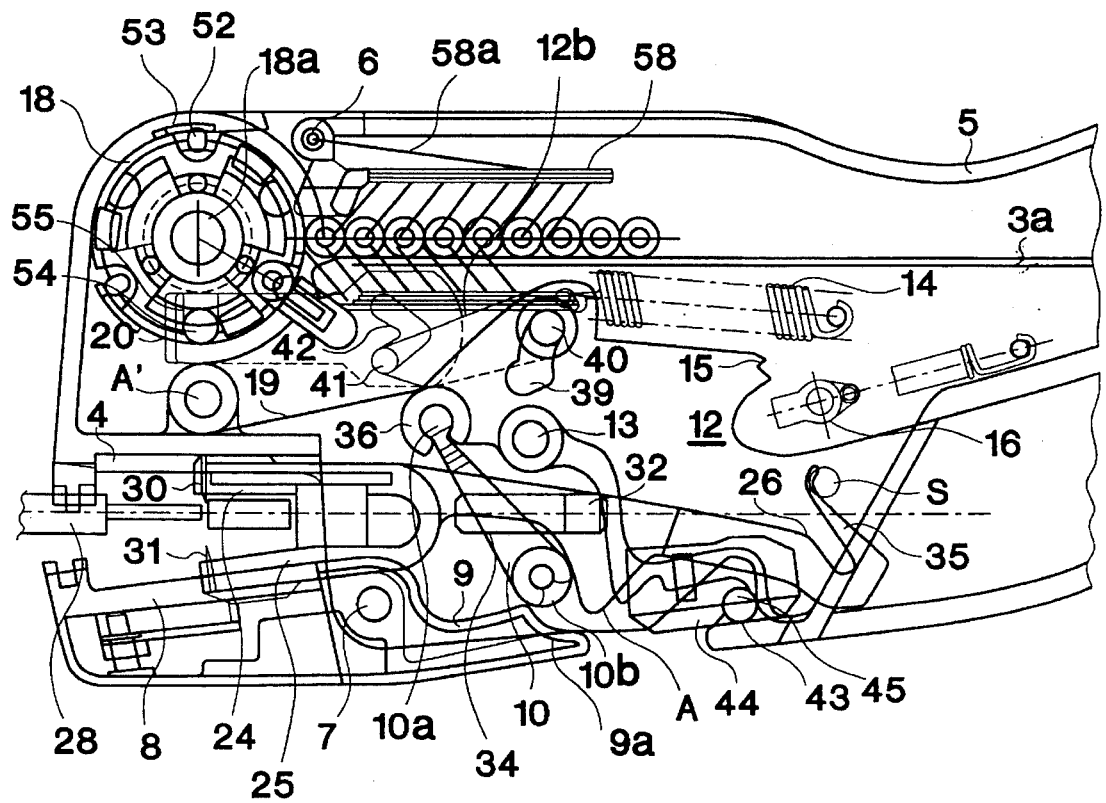
FIG. 4 shows a longitudinal section, shown enlarged, through the tongs, with the handles completely pressed together.

In accordance with FIG. 1, the tongs 1 according to the invention have an integral, hollow tongs body 2 whose rear part is formed by an upper and non-moving handle 3. The front part of the tongs body 2 is constructed in the form of a stationary clamping jaw 4. A cover 5 of the tongs body 2 can pivot about an axis 6 so that the interior of the tongs body 2 is accessible from the upper side of the tongs 1.

A moving clamping jaw 8 in the lower region of the tongs body 2 is supported by means of a bearing pin 7 such that it can pivot. Said clamping Jaw 8 is opposite the stationary clamping Jaw 4. A control surface 9 of the moving clamping jaw 8, which overhangs the bearing pin 7 at the rear and faces the tongs body 2, is acted on by a jointed lever 10 which slides along the control surface 9 and thus controls the opening and closing of the moving clamping jaw 8. This is described in more detail later.

A lower handle 11 of the tongs 1 is integrally connected to a drive part 12, the drive part 12 being supported on the tongs body 2 by means of a bearing pin 13 such that it can pivot. The lower handle 12 is thus held on the tongs body 2 via the drive part 12 and the bearing pin 13 such that it can pivot, so that a relative movement is possible between the lower handle 11 and the upper handle 3. A tension spring 14 engages on the drive part 12 above the bearing pin 13 and is, on the other hand, connected to the tongs body 2 at a point which lies in the direction of the upper handle 3. Thus, with the aid of the tension spring 14, the lower handle 11 is rotated around the bearing pin 13 in the clockwise direction so that the tension spring 14 tries to hold the handles 3 and 11 continuously in the opened position.

A short row of teeth or a tooth gap 15 at the rear end of the drive part 12 interacts with a spring-loaded locking hook 16, which is supported in the tongs body 2 such that it can rotate, as a block against premature opening of the tongs 1.

In the part of the tongs body 2 which is located at the top and front there is a crimping station 17 to which a crimping drum 18 and a crimping lever 19 belong. As is still to be explained, the crimping lever 19 is driven with the aid of the drive part 12, while the drive part 12 also ensures rotation of the crimping drum 18, to be precise with the aid of a transportation lever 20, which can be seen in FIG. 4. The drive part 12, the jointed lever 10 and the transportation lever 20 form a drive device 21.

FIG. 2 shows a cross-section through the upper handle 3 along the line A—A in FIG. 1. As can be seen, the upper handle 3 is constructed in the shape of a cavity and, in its lower region, has a base 3a which is connected at the side to the walls of the handle 3. The base 3a also extends out of the handle 3 into the tongs body 2 and is guided up to a point close to the crimping station 17. In the space formed by the base 3a, the upper handle 3 and the cover 5, contact elements can be stored which are to be crimped to core ends, for example core end sleeves 22 which are linked to one another in the form of a strip. They are fed to the crimping station 17 with the aid of a supply and transportation station 23 which is positioned on the base 3a close to the crimping station 17.

FIG. 3 shows the cross-sectional shape of the lower handle 11 in more detail. This is a cross-section along the line B—B in FIG. 1. The lower handle 11 is constructed to be open in the direction of the upper handle 3 and essentially to have a U-shape.

The most essential components for carrying out stripping are described in more detail in the following text, making reference to FIGS. 4 and 5. Elements which are identical to those in FIGS. 1 to 3 are provided with identical reference numbers.

A pair of cutting Jaws 24, 25 which are integrally connected to an elongated tension element 26 are arranged between the stationary clamping jaw 4 and the moving clamping jaw 8. Cutting jaws 24, 25 and the tension elements 26 may be produced, for example, from plastic. The upper cutting jaw 24 which rests on the stationary clamping jaw 4 supports an adjustable end stop 27 for a conductor end 28 which is to be stripped. The end stop 27 can be displaced in a longitudinal slot 29 in a clamping manner. In the respective front region on mutually facing sides, the cutting jaws 24 and 25 have blades 30 and 31 for cutting through the insulation of a conductor end. The lower cutting jaw 25, which is flexibly connected in its rear region to the upper cutting jaw 24 such that it can pivot, is guided by the moving clamping jaw 8. When the moving clamping jaw 8 rotates about the bearing pin 7 in the clockwise direction, on the one hand the conductor end 28 is thus clamped in between the clamping jaws 4 and 8 while, on the other hand, the cutting jaws 24 and 25 are also moved towards one another so that the blades 30 and 31 can cut through the insulation of the conductor end 28. The movement of the lower clamping jaw 8 and hence also of the lower cutting jaw 25 take place by driving the jointed lever 10 which slides along the control surface 9 of the moving clamping jaw 8, as is still to be explained.

This jointed lever 10 is also used for longitudinal displacement of the cutting jaws 24 and 25 in the direction of the handles 3 and 11.

As has already been mentioned, the upper and lower cutting jaws 24 and 25 are integrally connected to the elongated tension element 26. This tension element 26 has two horizontal lateral arms 32 and 33 on opposite sides, which lateral arms are guided in mutually opposite longitudinal slots 34 which are located in the side region of the tongs body 2. The horizontal lateral arms 32 and 33 may have a rectangular or round cross-section. In the case of a rectangular cross-section, rotation of the lateral arms 32 and 33 in the longitudinal slots 34 is not possible.

Furthermore, a projection A, pointing downwards, is integrally connected to the elongated tension element 26, the front surface of which projection A, pointing to the cutting jaws 24 and 25, is acted on by the jointed lever 10 in order to displace the elongated tension element 26 over the projection A to the rear, as is still to be described.

At the rear end of the elongated tension element 26 there is an end part 35 which is of flexible design and has been obtained for example by bending and narrowing the rear part of the tension element 26. This end part 35 is supported elastically on a supporting element S which is attached to the lower handle 11. The supporting element S may have, for example, the shape of a lateral rod which runs between two side walls of the lower handle 11. If the jointed lever 10 releases the projection A, the elongated tension element 26, and together with it, the cutting jaws 24 and 25 are thus again moved by the elastic end part 35 in the direction of the front side of the tongs 1. The component which consists of the upper and lower cutting jaws 24 and 25 and of the elongated tension element 26 can likewise, for simplicity, be designated as an elongated tension element.

Figure 5:
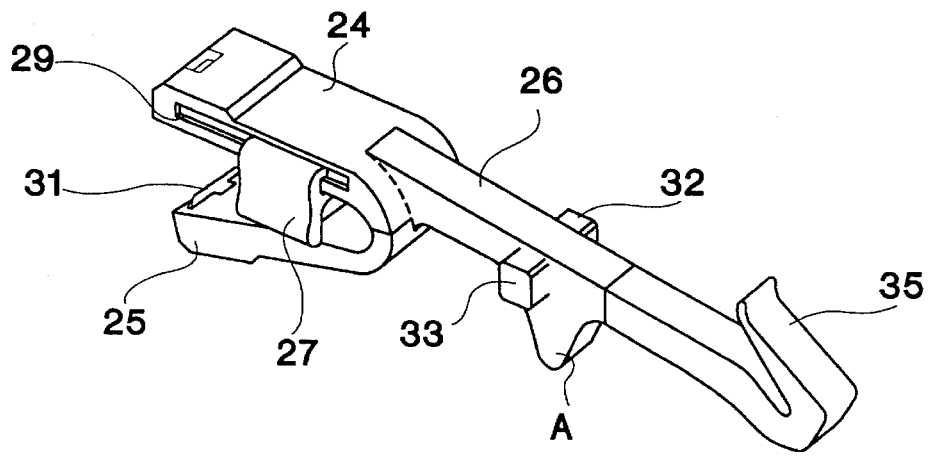
FIG. 5 shows a perspective representation of a tension element in the tongs, which is used for stripping.

As can be seen from FIG. 4, the jointed lever 10 has at its upper end a bead 10a which is supported in a bearing 36 of the drive part 12 such that it can pivot. At its lower end, the jointed lever 10 has a sliding element 10b, for example a sliding roller. The jointed lever 10 is thus held in the bearing 36 and lies between the drive part 12 and the guide surface 9 of the moving clamping jaw 8. Furthermore, the bearing 36 is located in a position which is displaced in the forwards direction of the tongs 1 with respect to the bearing pin 13.

If the lower handle 11 is thus rotated in the direction of the upper handle 3, then the drive part 12 rotates around the bearing pin 13 at the same time. In this case, the rotation takes place in the anticlockwise direction. This means that the jointed lever 10 deviates to the right and in the anticlockwise direction on the control surface 9 and thus initially closes the moving clamping jaw 8 with corresponding forming of the control surface 9, that is to say moves in the direction of the stationary clamping jaw 4. When it reaches the more steeply inclined control surface 9a, which is connected to the control surface 9 to the rear, the moving clamping jaw 8 is released which has the consequence that it can be rotated in the anticlockwise direction around the bearing pin 7. The clamping and cutting jaws thus open.

In the case of the already described movement of the jointed lever 10, the elongated tension element 26 is at the same time driven to the rear, that is to say it is displaced in the direction of the handles 11 and 3, since the sliding element 10b of the jointed lever 10 also presses against the front surface of the projection A and displaces said projection to the rear. When the handles 3 and 11 are released, they can thus move apart from one another again because of the tension force of the tension spring 14, then, on the one hand, the drive part 12 is rotated clockwise about the bearing pin 13 so that the jointed lever 10 can no longer act on the control surfaces 9 and 9a, while, on the other hand, the elongated tension element 26 is displaced to the front because of the effect of the elastic end part 35. The jointed lever 10 now no longer blocks the projection A. It is also displaced with this projection A to the front part of the control surface 9.

With the displacement of the elongated tension element 26 to the rear, the insulation of the conductor end 28 is pulled off the conductor while the insulation which is pulled off falls out to the side with the opposite movement.

Figure 6:
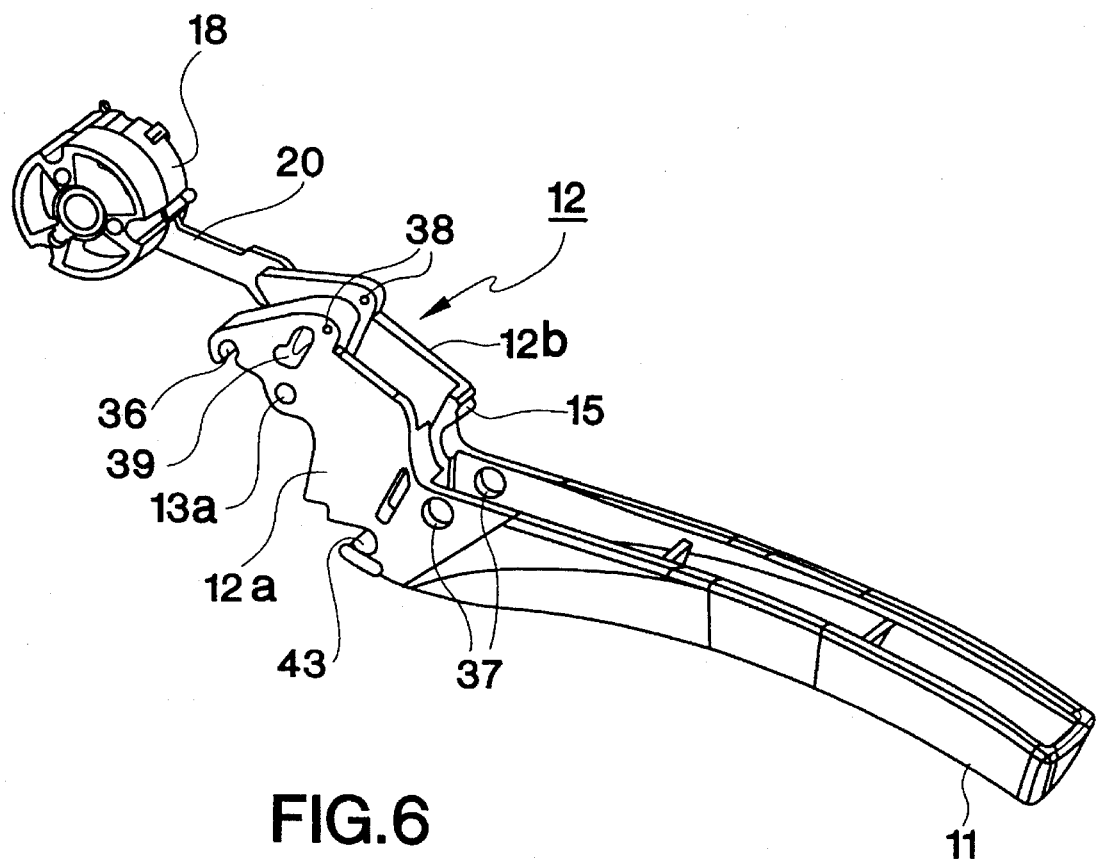
FIG. 6 shows a perspective view of the lower handle from one side, with the drive device and the crimping drum attached.
Figure 7:
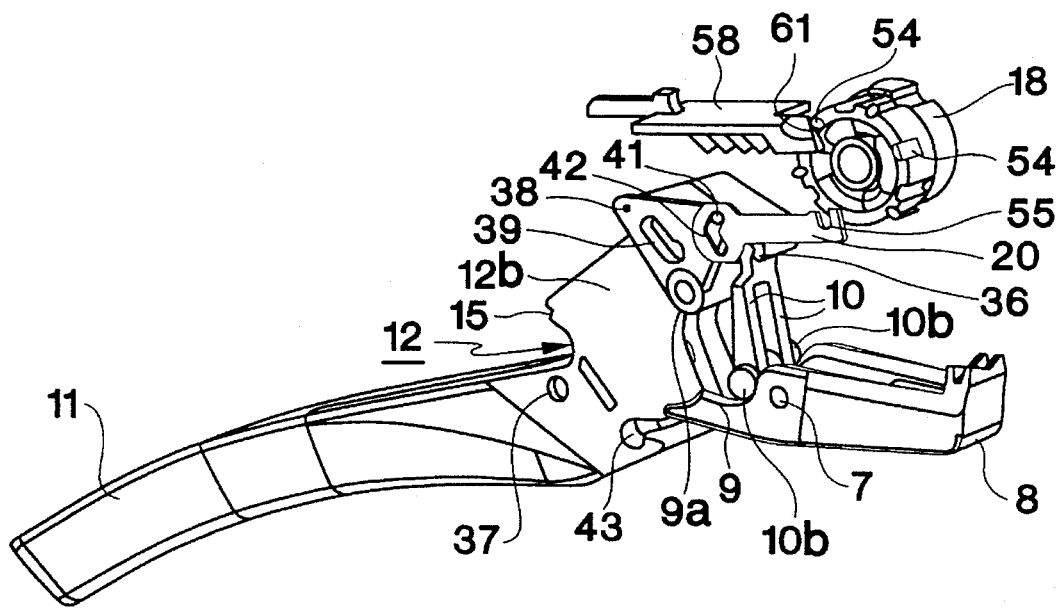
FIG. 7 shows a perspective view of the lower handle of the tongs from the other side, with a moving clamping jaw also attached.

FIGS. 6 and 7 show the construction of the moving or lower handle 11 in more detail. In this case, its one side can be seen in FIG. 6 and its other side in FIG. 7.

The drive part 12 is integrally connected to the front part of the lower handle 11, as has already been explained. The drive part 12 has two wall regions 12a and 12b which lie parallel to one another, in each case form the extensions of the side walls of the lower handle 11 and, in addition, can also be laterally reinforced one beneath the other. Openings 37 in the front side walls of the lower handle 11 are used for holding the rod-shaped supporting element 36 (FIG. 4). The tooth gap 15 is present only on the right-hand wall element 12b.

From FIG. 6 it can be seen that there is an opening 13a for the bearing pin 13 in the left-hand wall element 12a, as well as the bearing 36 for holding the one end 10a of the jointed lever 10. Furthermore, openings 38 for the attachment of the tension springs 14 are provided in both wall elements 12a, 12b.

In addition, there are bent guide tracks 39, in which a pin 40 of the crimping lever 19 is guided, in both wall elements 12a, 12b. This crimping lever 19 passes through both guide tracks 39 which are arranged superimposed.

According to FIG. 7, located on the right-hand wall element 12b there is also a pin 41 which engages in a bent guide track 42 at the end of the transportation lever 20. This transportation lever 20 represents the coupling between the drive part 12 and the crimping drum 18, as is still to be described.

It can likewise be seen from FIG. 7 how the jointed lever 10 is supported in the bearing 36 and drives the moving clamping jaw 8. The jointed lever 10 consists of two parallel webs and in each case has externally located sliding rollers 10b which slide along the control surfaces 9, 9a.

Not least, a counter-bearing 43 for holding a conductor which is to be sheared can be seen in FIGS. 6 and 7. This counter-bearing 43 interacts with a blade 44 (FIGS. 1 and 4) which is guided in the region of the counter-bearing 43, or crosses said bearing, when the handles 11 and 3 are pressed together. In FIGS. 1 and 4, a conductor which is to be sheared is provided with the reference symbol 45. The blade 44 may be attached, for example, to the inner side wall of the tongs body 2. In this case, it covers a slot 46 in the side wall in which the conductor, which is only partially sheared, can run.

The components of the tongs 1 which are required for crimping are described in detail in the following text.

In accordance with FIGS. 1 and 4, the crimping drum 18 is supported in the front upper region of the tongs body 2. The crimping drum 18 can rotate about a shaft 18a which is attached to opposite-side walls of the tongs body 2. The shaft 18a runs virtually at right angles to the plane of the tongs. Furthermore, the crimping drum 18 can also be displaced by a specific amount in the axial direction on this shaft 18a, it being pretensioned to the front in the axial direction with the aid of spring force that is to say out of the plane of the paper when viewing FIGS. 1 and 4. FIGS. 1 and 4 show a plan view onto the front side of the crimping drum 18.

Figure 8:
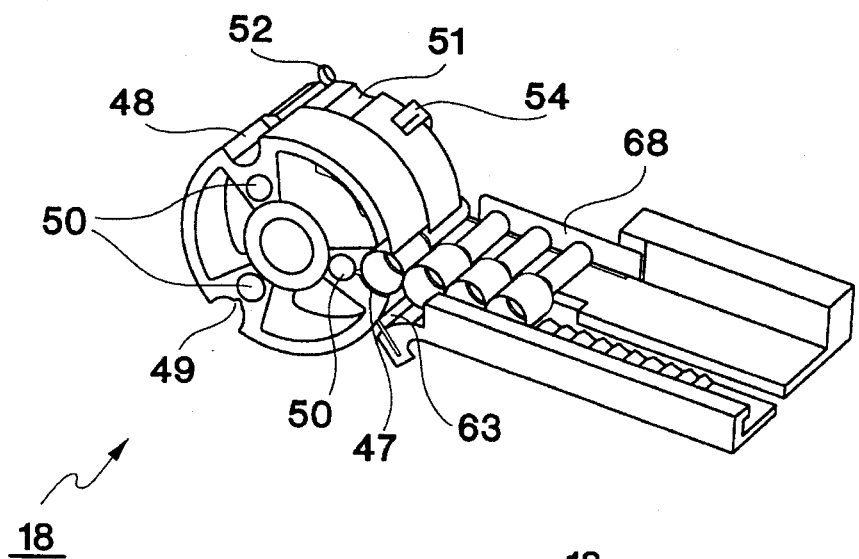
FIG. 8 shows a perspective view of the crimping drum, shown enlarged, with a supply station assigned for core end sleeves.

As can furthermore be seen, on its circumference, the crimping drum 18 has a multiplicity of depressions 47, 48, 49 running in the axial direction, as is shown especially in FIG. 8. These depressions 47, 48 and 49 are suitable for holding contact elements which are to be crimped to the conductor ends and may be, for example, core end sleeves. The depressions 47, 48, 49 may be of different size in order to be able to use different size core end sleeves for conductors having cross-sections of different size. The depressions 47, 48, 49 are preferably arranged on the circumference, at equal angular intervals.

Figure 9:
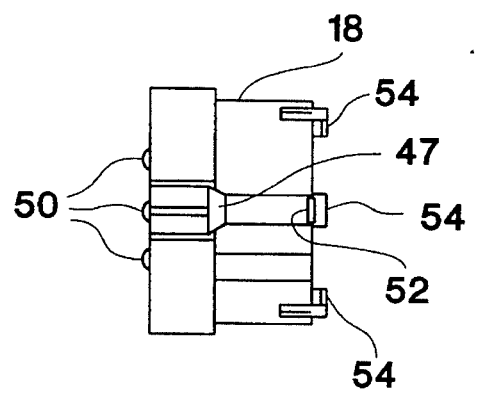
FIG. 9 shows a side view of the crimping drum according to FIG. 8.

FIG. 9 shows a side view of the crimping drum 18 with a view of the depression 47. As can be seen, the crimping drum 18 has projections 50 on its left-hand and front side, which are allocated to the respective depressions. These projections 50 are used for locking the crimping drum 18 when the respectively allocated depression is in a loading position in which it can receive, for example, a core end sleeve. The crimping drum 18 can be rotated by hand, for which purpose the tongs body 2 can be provided with a corresponding recess in the circumferential region of the crimping drum 18. The projections 50 on the front side are pressed into corresponding recesses with the aid of the already mentioned spring force, so that in consequence a certain position stabilisation of the crimping drum 18 is obtained.

The rotation of the crimping drum 18 for locking a depression in the loading position is possible at any time, the crimping drum 18 not yet being coupled to the drive device 21 in this state. When the crimping drum 18 is rotated by hand, although the projections 50 (locking tabs) are rotated out of the openings holding them against the spring force, the projections 50 have a height which is, however, so small that no axial displacement of the crimping drum 18 occurs which is large enough for coupling with the drive device to be able to take place. The crimping drum 18 can be, so to speak, preset, in order to be able to process core end sleeves of a specific size.

In addition, on its circumference, the crimping drum 18 has additional recesses 51 which are located at predetermined angular intervals with respect to the depressions, a crimping stamp which is still to be described being inserted into the additional recesses 51 when a depression 47 to 49 is located in the loading position.

It can best be seen in FIG. 8 that each depression is terminated on the rear side of the crimping drum 18 opposite the conductor insertion side (front side) by a locking lug 52 which projects beyond the circumference of the crimping drum 18. If a conductor is inserted from the conductor insertion side (from the front in FIG. 8) into a depression 47 to 49, its tip touches the locking lug 52 which leads to the complete crimping drum 18 being displaced axially to the rear if suitable pressure is applied. During subsequent rotation of the crimping drum 18 (which is then coupled to the drive device), the locking lugs 52 engage behind locking walls 53 which are fixed to the housing, as can be seen for example in FIG. 13. The axial displacement of the crimping drum 18 can thus be locked for a certain time. Once the crimping process is completed, the crimping drum 18 is rotated back which means that the locking lugs come free again so that the crimping drum 18 is displaced axially to the front again because of the spring force.

On the rear side of the crimping drum 18, at a predetermined angular interval with respect to the depressions 47 to 49, there are axially running projections 54, as can be seen for example in FIGS. 7 and 8. If the crimping drum 18 is displaced axially to the rear by insertion of a conductor end into a depression 47 to 49, then not only do the locking lugs 52 engage behind the locking walls 53 but, at the same time, the projections 54 also engage with a vertical slot 55 at the other end of the transportation lever 20. This is best seen in FIG. 7. Since the crimping drum 18 is now locked in its rearward axial position, to be precise because of the effect of the elements 52 and 53, the crimping drum 18 can now be rotated via the transportation lever 20, with the aid of the drive part 12. The precise movement sequence is described in more detail later, making reference to FIGS. 15a to 15c. However, in summary, when the handles 3 and 11 are pressed together and during the subsequent opening process, a movement of the crimping drum 18 results, in which movement a depression is initially rotated out of the loading position into a crimping position and is subsequently rotated back into the loading position again. In the present example, three depressions for contact elements or core end sleeves are provided. For example, the respective depressions may hold core end sleeves for cross-section sizes of 0.5/0.75 and 1/1.5 and 2.5 mm². In order that the conductor end can follow the rotary movement of the crimping drum 18, there is a suitable slot, like a circular segment, in the wall of the tongs body 2.

Figure 12:
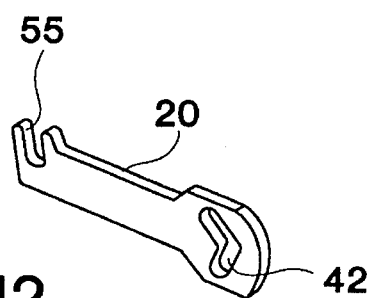
FIG. 12 shows a transportation lever of the drive device, to which the crimping drum can be coupled.

FIG. 12 shows the detailed construction of the transportation lever 20. The latter consists of a plate of key-shaped construction which has the vertical slot 55 at its front end and a bent guide slot 42 at its rear end, whose opening angle points towards the vertical slot 55. The transportation lever 20 can be guided between the rear wall of the tongs body 2 and the rear side of the wall element 12b.

Figure 10:
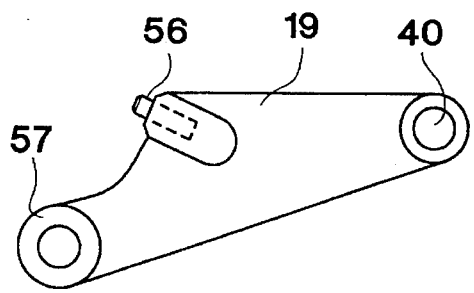
FIG. 10 shows a crimping lever with a crimping stamp inserted.
Figure 11:
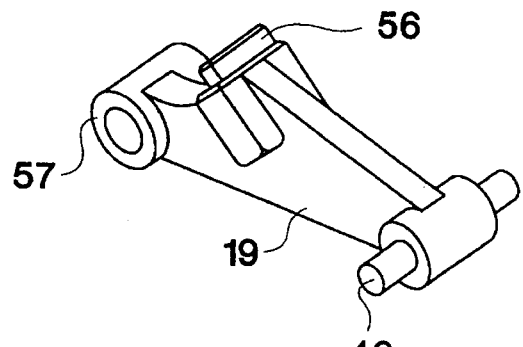
FIG. 11 shows a crimping lever and crimping stamp in a perspective representation.

FIGS. 10 and 11 show the precise construction of the crimping lever 19 which has already been mentioned. The crimping lever 19 supports a crimping stamp 56 which is guided in a suitable manner on an element which is to be crimped when the latter has been moved into the crimping position by means of the crimping drum 18. For this purpose, on its lower end, the crimping lever 19 has a bearing device 57 via which said lever is supported in the tongs body 2 such that it can pivot. The bearing device 57 may, for example, be a reinforced hollow cylinder through which a shaft A' runs (FIG. 4) which is attached to the tongs body 2. The crimping lever 19 can then pivot about this shaft A'.

At the opposite end of the crimping lever 19 from the bearing device 57, said lever is provided with the already mentioned pin 40 which runs parallel to the axis of the bearing device 57. The crimping lever 19 engages by means of this pin 40 in the bent guide track 39 which is located inside the drive part 12, more precisely inside both wall regions 12a and 12b. In consequence, a particularly stable connection is achieved between the drive part 12 and the crimping lever 19.

Figure 13:
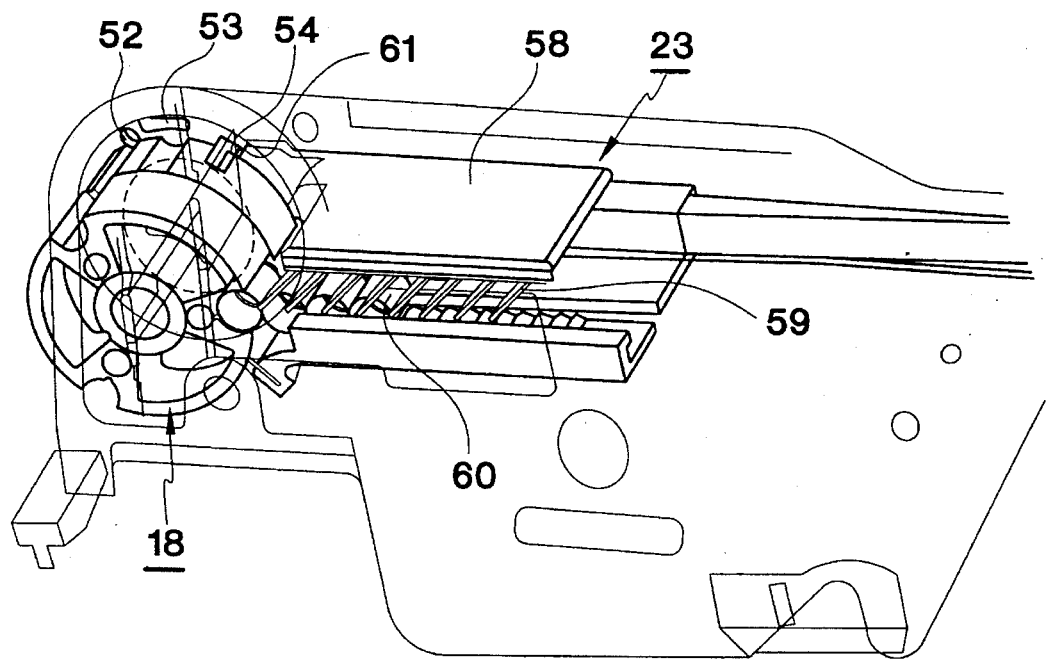
FIG. 13 shows a perspective view of the tongs in the region of the crimping drum and of the supply station, in order to explain the construction of a transportation device for core end sleeves.

FIG. 13 shows a perspective view of the crimping drum 18 with the supply and transportation device 23 for core end sleeves connected. The crimping drum 18 is in this case in the loading position.

The supply and transportation device 23 has a transportation plate 58 which can be moved onto the crimping drum and away from the crimping drum. Provided on the lower side of the transportation plate 58 in the direction of the crimping drum 18 are projecting lugs or plastic lugs or even brushes 59 which move the core end sleeves, provided with the reference symbol 60 in this case, in the direction of the crimping drum 18 when the transportation plate 58 is to be moved onto the crimping drum 18. The transportation plate 58 is pretensioned in the direction of the crimping drum 18 with the aid of a spring which is not shown. This spring may be arranged, for example, between the transportation plate 58 and the side wall of the tongs body 2.

If the crimping drum 18 is displaced axially with the aid of a conductor end such that the locking lug 52 moves behind the locking wall 53, and if the crimping drum 18 is then rotated out of the loading position into the crimping position then one of the projections 54 which is located at the top takes the transportation plate 58 with it, in other words presses the latter away from the crimping drum 18, to be precise over an inclined surface 61 for the projection 54. This inclined surface 61 can also be seen well in FIG. 7. If the transportation plate 58 is moved away from the crimping drum 18 by the projection 54, the clamping spring 58a which is located between it and the tongs body 2 is tensioned so that, when the crimping drum 18 has reached its loading position again and it is being displaced axially to the front again, the transportation plate 58 is moved to the crimping drum 18 via the clamping spring 58a and pushes a next core end sleeve 60 into the depression located in the loading position. The inclined surface 61 is now exposed since the projection 54 has been removed from the inclined surface 61 to the front, by axial displacement of the crimping drum 18. An elastic element 68 is used for returning the core end sleeves into their axial initial position.

Figure 13A:
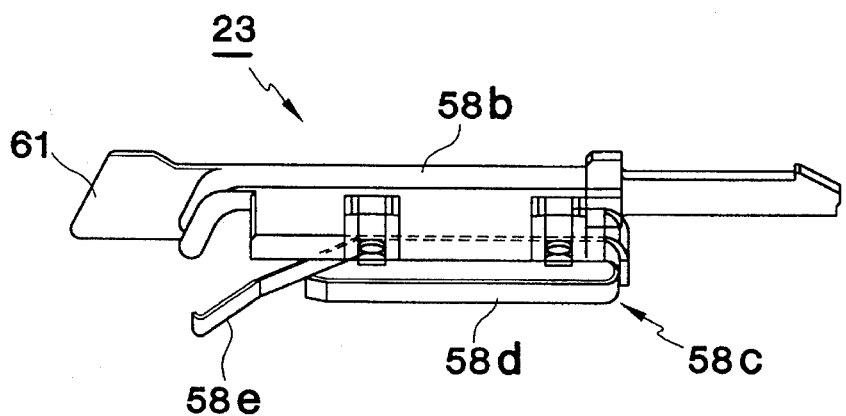
FIG. 13a shows another configuration of the transportation device.

FIG. 13a shows a further configuration of the supply and transportation device 23. Instead of the lugs or brushes, in this case the transportation plate 58b supports an elastic spring element 58c on its bottom side, which is produced for example from spring steel or plastic. The elastic spring element 58c has a horizontal arm 58d which comes to rest on the core end sleeve belt and presses the core end sleeves 60 against their supporting layer 3a. An arm 58e, which runs obliquely from above to the front or in the direction of the crimping drum 18, of the spring element 58c in contrast engages in the region between the core end sleeve 60 lying next with respect to the crimping drum 18 and the subsequent core end sleeve in order to push the first-mentioned core end sleeve into the depression which is located in the loading position when the spring element 58c with the transportation plate 58b is moved onto the crimping drum 18. During the opposite movement of the transportation plate 58b, the horizontal arm 58d slides away over the core end sleeves without taking them with it. The arm 58e and the horizontal arm 58d may also be present as separate elements.

Figure 14:
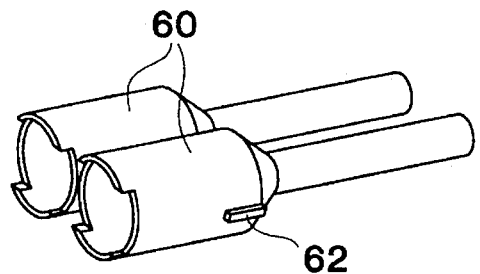
FIG. 14 shows a perspective view of core end sleeves which are linked in the form of a strip.

The core end sleeves themselves are shown enlarged in FIG. 14. They are linked to one another in the form of a belt and lie parallel to one another. A connecting web between adjacent core end sleeves 60 has the reference symbol 62. This connecting web 62 is sheared by a blade 63 which can clearly be seen, for example, in FIG. 8. As soon as the crimping drum 18 is rotated out of the loading position into the crimping position, the core end sleeve 60 lying in the depression 47 is moved downwards so that the connecting web 62 is pulled over the blade 63 and is sheared by it.

Figure 15A:
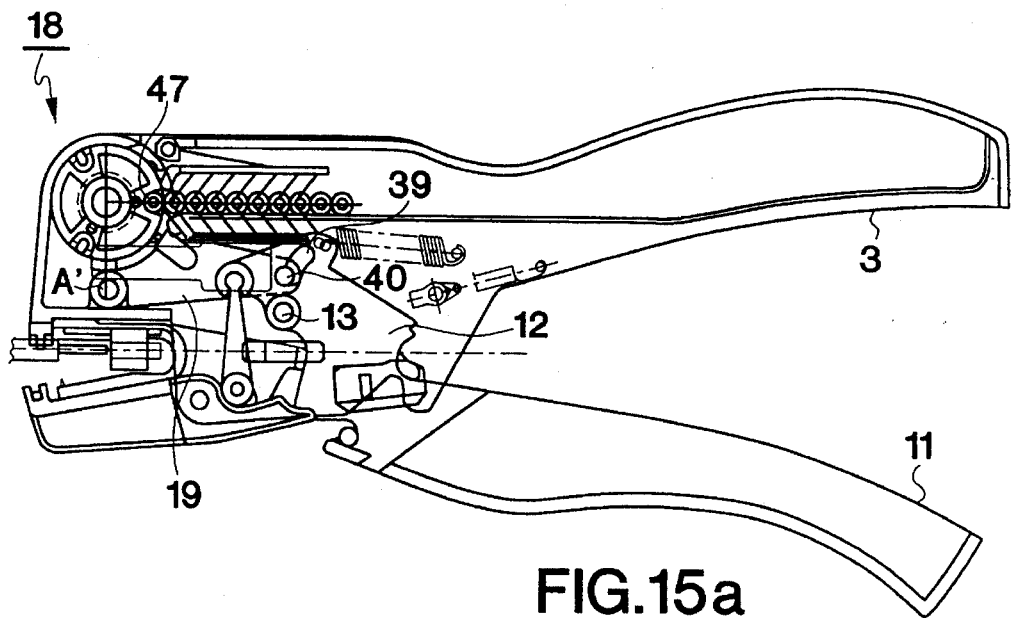
FIGS. 15a to 15c show various operating positions of the tongs.
Figure 15B:
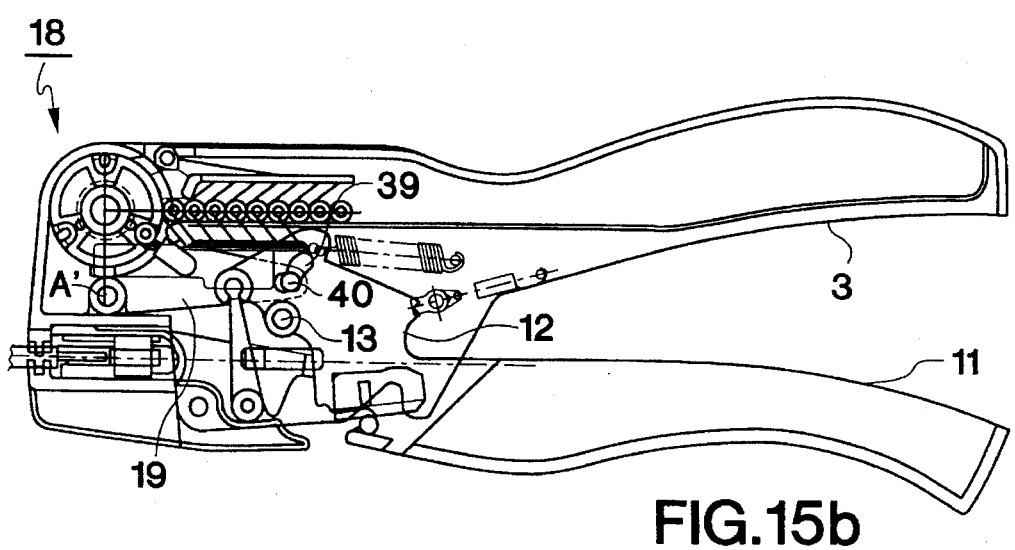
Figure 15C:
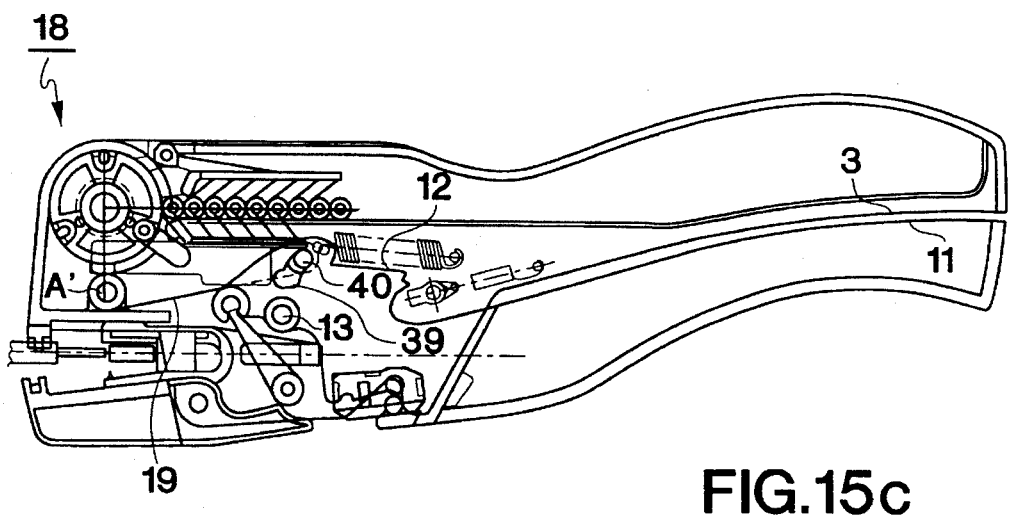

The method of operation of the tongs 1 during crimping are described in more detail in the following text. Reference is made to FIGS. 1, 4 and 15 for this purpose. FIG. 15 shows the tongs with the handles completely opened (FIG. 15a), with the handles half pressed together (FIG. 15b) and with the handles completely pressed together (FIG. 15c). In FIGS. 1 and 15a, the crimping drum 18 is in the loading position, while it is in the crimping position in FIGS. 4, 15b and 15c.

If a conductor end is initially inserted into the depression 47 which is in the loading position, the crimping drum. 18 is in consequence displaced axially to the rear, to be precise against a spring force. At the same time, the locking lug 52 moves into an axial position which lies behind the axial position of the locking wall 53. At the same time, the projection 54, which is allocated to the depression 47 which is located in the loading position, engages with the vertical slot 55 in the transportation lever 20. If the handles 3 and 11 are now moved towards one another, the locking lug 52 moves behind the locking wall 53 and hence locks the axial position of the crimping drum 18. At the same time, the depression 47 moves out of the loading position in the direction of the crimping position.

When the handles 11 and 3 are pressed together, the drive part 12 is rotated about the bearing pin 13, to be precise in the anticlockwise direction in the figures. At the same time, the transportation lever 20 is initially displaced in the direction of the crimping drum 18, since the pin 41 is located in the upper region of the guide 42, which is constructed in the form of an angle, as a deviation from the position shown in FIG. 4. This means that a rotation of the crimping drum 18 initially takes place by means of the movement of the transportation lever 20. At the same time, the depression 47 moves out of the loading position into the crimping position (FIG. 15b) before a rotation of the crimping lever 19 takes place. During the time in which the crimping drum is rotating about the aforementioned path, the pin 40 moves only in the horizontally lying branch within the guide 39, which is shaped like an angle, so that the crimping lever 19 is not taken with it during movement of the drive part 12.

If the handles 3 and 11 are pressed further together (FIG. 15c) after the depression 47 has reached the crimping position (FIG. 15b), the pin 40 of the crimping lever 19 now runs upwards in the vertical branch of the guide 39, so that the crimping lever 19 is rotated about its bearing shaft A' in the anticlockwise direction. At the same time, the crimping stamp 56 is pressed into the core end sleeve which at this time is located in the crimping position.

During this final part of the movement of the handles 3 and 11, the pin 41 (see FIG. 4) runs in the lower branch of the guide 42, to be precise from the center downwards, so that the transportation lever is not moved further. Thus, if the crimping stamp 56 is pressed against the core end sleeve, the crimping drum 18 remains at rest.

The crimping stage, in which the handles 3 and 11 are completely pressed together, is shown in FIG. 4.

If the load is removed from the handles 3 and 11, then the spring 14 tries to open the handles 3 and 11. The spring 14 thus pulls the drive part 12 in the clockwise direction about the bearing pin 13. At the same time, on the one hand, the pin 41 runs in the lower branch of the guide 42 into the central region of the latter, without this causing the transportation lever 20 to be moved back. The crimping drum 18 thus initially remains at rest. On the other hand, in contrast, during this first opening phase, the pin 40 runs downwards in the vertical branch of the guide 39 so that the crimping lever 19 is rotated about the bearing shaft 58 in the clockwise direction. The crimping stamp 46 is thus removed from the crimping drum 18. If the pin 41 is located in the central region of the guide 42 and the pin 40 is located in the lower region of the vertical branch of the guide 39, the next movement phase starts. To be precise, the pin 41 now runs in the upper region of the guide 42 and in consequence pulls the transportation lever 20 back in the direction of the handles 3 and 11. The pin 54 is thus taken with it via the vertical slot 55, which results in a rotation of the crimping drum 18 in the anticlockwise direction. The depression 47 is thus moved back into the loading position again. During this second movement phase, the crimping lever 19 remains virtually at rest since the pin 40 is now still running only in the-horizontal branch of the guide 39.

As soon as the depression 47 has reached its loading position, and the transportation lever 20 has thus been moved back completely to the right in FIG. 4, the locking lug 52 comes free from the locking wall 53 so that the crimping drum 18 is pressed to the front again, to be precise because of the spring which is arranged between it and the rear wall of the tongs body 2. At the same time, the projection 54 is also taken out of the vertical slot 55 so that there is no longer any coupling between the transportation lever 20 and the crimping drum 18. At the same time, as a result of the backward movement of the crimping drum 18, that is to say as a result of the axial backward displacement, the inclined surface 61 is released since the projection 54 lying on it is also pulled back. As a consequence of the spring drive, the transportation plate 58 can thus push a further core end sleeve into the depression which is located in the loading position. A tension spring between the tongs body 2 and the transportation plate 58 has, for example, the reference symbol 58a in FIG. 4.

It should be mentioned that, as a consequence of the rotation, the crimping drum 18 is moved back into the axial original position again after each movement cycle, in the clockwise and anticlockwise directions, that is to say it is decoupled from the drive device and the transportation lever 20.

If the crimping drum 18 is not displaced axially by a conductor end, then there is no coupling between the projection 54 and the transportation lever 20. When the handles 3 and 11 are moved together, the same processes nevertheless take place as have been described above. On the one hand, the transportation lever 20 now also moves in a reciprocating manner while, on the other hand, the crimping lever 19 is pivoted about its pivoting shaft A. The crimping stamp 56 is thus always moved into the crimping position, even when the depression should be located in the loading position. In order to prevent damage to the crimping drum in this event, it has additional recesses in its surface, which have the reference symbol 51 in FIG. 8. These recesses are located in the crimping position when the allocated depression is located in the loading position. The crimping stamp 56 can thus carry out its full movement even in the last-mentioned case. The essential feature is that, when the crimping drum is not required, that is to say when no crimping process is intended to be carried out, the crimping drum is not rotated since very much more force must be exerted for its rotation than for the movement of the transportation lever 20 and the crimping lever 19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Tongs for dressing conductor ends, comprising:

two handles which are movable relative to one another;

a first dressing station for dressing a conductor end;

a drive device for driving the first dressing station during operation of the handles, the handles and the first dressing station being operatively connected to the drive device;

a second dressing station which is selectively driven via the drive device, the second dressing station being a crimping station having a rotatable drum which rotates about a rotation axis, a core end sleeve being positionable in the rotatable drum and being crimped onto a conductor end during crimping; and means for selectively coupling the crimping station to the drive device only when the crimping station is moved in an axial direction, the crimping station being moved in the axial direction by the conductor end to be dressed being inserted into the crimping station, the axial direction in which the crimping station is moved being generally parallel to the rotation axis such that movement of the crimping station in the axial direction couples the crimping station to the drive device.

2. Tongs according to claim 1, wherein one crimping process comprises insertion of the conductor end into the crimping station, subsequent movement of the crimping station in the axial direction by the inserted conductor end, and movement of the handles toward one another, the crimping station being coupled to the drive device only once for each crimping process.

3. Tongs according to claim 1, wherein the crimping drum has a plurality of depressions around a circumference thereof, the depressions extend in the axial direction and hold contact elements of different size which are to be crimped to the conductor end.

4. Tongs according to claim 3, wherein each depression is terminated on a rear side of the crimping drum opposite a conductor insertion side with a locking lug which projects beyond the circumference of the crimping drum.

5. Tongs according to claim 4, further comprising a housing and locking walls fixed to the housing, the locking lugs engage behind the locking walls after axial displacement and rotation of the crimping drum, the rotatable crimping drum being located within the housing.

6. Tongs according to claim 3, wherein the crimping drum is provided on a rear side with axially running projections, at least one of the projections being engaged with the means for selectively coupling when the crimping station is moved in the axial direction, the means for selectively coupling including a transportation lever of the drive device.

7. Tongs according to claim 3, wherein the crimping drum is rotated to move out of a loading position and into a crimping position and back into the loading position, one of the plurality of depressions in the crimping drum being opposite a crimping stamp when the crimping drum is in the crimping position.

8. Tongs according to claim 7, wherein the crimping drum has further recesses on a circumference thereof, the crimping stamp being moved into at least one of the further recesses when a depression is located in the loading position.

9. Tongs according to claim 7, wherein the crimping stamp is attached to a crimping lever which is supported on the front tongs body by one end thereof, such that the crimping lever can pivot, and the crimping lever engages the drive part with an other end thereof.

10. Tongs according to claim 5, wherein the crimping drum is pretensioned in a direction of a conductor insertion side and wherein the crimping drum has locking tabs to lock a depression in loading position.

11. Tongs according to claim 1, wherein the two handles include an upper handle, the tongs further comprising a cavity provided in the upper handle, the upper handle being integrally connected to a front tongs body in which the crimping station is located.

12. Tongs according to claim 11, wherein the two handles include a lower handle and wherein the lower handle is integrally connected to a drive part of the drive device and is pivotably supported on the tongs body via the drive part.

13. Tongs according to claim 12, further comprising a transportation lever engaging the drive part for rotating the crimping drum.

14. Tongs according to claim 13, wherein the transportation lever and the crimping lever each engage the drive part via pins which are positioned in angled guide tracks.

15. Tongs according to claim 12, further comprising at least one tension spring being tensioned between the drive part and the upper handle or tongs body in order to pretension the handles in an opened position.

16. Tongs according to claim 11, wherein the upper handle and tongs body form a supply space for the contact elements.

17. Tongs according to claim 17, wherein the contact elements are core end sleeves arranged in a row one on top of the other in the form of a strip.

18. Tongs according to claim 16, further comprising a blade positioned in the vicinity of a circumferential edge of the crimping drum blade cutting a core end sleeve which is inserted in a depression when the depression is moved out of the loading position into the crimping position to thereby separate the core end sleeve in the depression from other core end sleeves arranged in the row.

19. Tongs according to claim 17, further comprising:

a plurality of projections on the rear side of the crimping drum, one of the projections feeds a forward one of the core end sleeves into a depression on the crimping drum, the crimping drum rotating after axial movement thereof to move the depression into a crimping position; and a transportation device on one of the two handles, the transportation device being pretensioned to be urged toward the crimping drum, the transportation device moves the forward one of the core end sleeves toward and away from the crimping drum in response to movement of the one of the projections.

20. Tongs according to claim 1, wherein the first dressing station is a stripping station.

21. Tongs according to claim 20, wherein the two handles include a lower handle and wherein the stripping station has a stationary clamping jaw on a lower part of a housing of the tongs and a moving clamping jaw supported on a front end of the lower handle by a bearing pin, the moving clamping jaw being pivoted about the bearing pin.

22. Tongs according to claim 21, wherein the moving clamping jaw has a control surface projecting beyond the bearing pin, the tongs further comprising a jointed lever having an end which slides along the control surface, the jointed lever having an other end which engages the drive part at a point which is located on the tongs in front of the bearing pin.

23. Tongs according to claim 22, further comprising a tension element having cutting and stripping jaws guided between the clamping jaws, the tension element having a projection extending towards the control surface, the projection being on a rearwardly extending extension of the tension element, the projection is engaged by the end of the jointed lever which slides along the control surface.

24. Tongs according to claim 23, wherein the tension element has lateral guide bolts which are guided in longitudinal grooves in the tongs body.

25. Tongs according to claim 24, wherein the extension of the tension element is provided with a flexible part, the flexible part in a first position being supported on a supporting element to urge the tension element, to a first position, the supporting element.

26. Tongs according to claim 23, wherein the tension element comprises an integral plastic part.

* * * * *